United States Patent
Zait

(10) Patent No.: US 9,826,380 B1
(45) Date of Patent: Nov. 21, 2017

(54) VIDEO OVER LTE DATA USAGE METERING

(71) Applicant: T-Mobile USA, Inc., Bellevue, WA (US)

(72) Inventor: Hichem Zait, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/196,392

(22) Filed: Jun. 29, 2016

(51) Int. Cl.
| | |
|---|---|
| H04M 11/00 | (2006.01) |
| H04W 4/26 | (2009.01) |
| H04M 7/00 | (2006.01) |
| H04M 15/00 | (2006.01) |
| H04L 29/06 | (2006.01) |
| H04W 84/12 | (2009.01) |

(52) U.S. Cl.
CPC .......... *H04W 4/26* (2013.01); *H04L 65/1016* (2013.01); *H04M 7/0024* (2013.01); *H04M 15/57* (2013.01); *H04M 15/64* (2013.01); *H04M 15/66* (2013.01); *H04M 15/886* (2013.01); *H04M 2201/50* (2013.01); *H04Q 2213/13248* (2013.01); *H04Q 2213/13337* (2013.01); *H04W 84/12* (2013.01)

(58) Field of Classification Search
CPC ......... H04M 2215/32; H04M 1/72519; H04W 8/245; H04W 4/24
USPC .............................. 455/405, 550.1, 418, 408
See application file for complete search history.

(56) References Cited

U.S. PATENT DOCUMENTS

| | | | | |
|---|---|---|---|---|
| 2011/0310740 A1* | 12/2011 | Ju | ........................ | H04W 28/08 370/235 |
| 2013/0148540 A1* | 6/2013 | Takizawa | ............ | H04L 65/1069 370/254 |
| 2014/0045481 A1* | 2/2014 | Fraley | ............... | H04W 52/0258 455/418 |

(Continued)

FOREIGN PATENT DOCUMENTS

| | | |
|---|---|---|
| JP | 2006526334 A | 11/2006 |
| KR | 20110047765 A | 5/2011 |

OTHER PUBLICATIONS

Ericsson, "Wi-Fi calling-extending the reach of VoLTE to Wi-Fi", Jan. 30, 2015.

(Continued)

*Primary Examiner* — Danh Le
(74) *Attorney, Agent, or Firm* — Han Santos, PLLC; Elliott Y. Chen

(57) ABSTRACT

The techniques for metering Video over LTE (ViLTE) data usage may ensure data consumption by subscribers are in line with their recurring service plans. A request to establish a video bearer between a mobile telecommunication network and a user device for a multimedia call may be received at a policy engine of a mobile telecommunication network. Subsequently, information that indicates a connection type used by the user device to connect to the mobile telecommunication network may be retrieved from a gateway of the network. The video bearer for a video over wireless local area network call of the user device may be established without ViLTE data usage metering in response to the user device having a WLAN connection type. However, the video bearer for a ViLTE call may be established with ViLTE data usage metering in response to the user device having a LTE connection type.

20 Claims, 13 Drawing Sheets

(56) References Cited

U.S. PATENT DOCUMENTS

| | | | |
|---|---|---|---|
| 2014/0176660 A1 | 6/2014 | Khay-Ibbat et al. | |
| 2014/0369187 A1* | 12/2014 | Sang | H04L 47/14 370/229 |
| 2015/0065157 A1* | 3/2015 | Homchaudhuri | H04W 72/082 455/452.1 |
| 2015/0135222 A1* | 5/2015 | Gossweiler, III | G06F 17/30867 725/44 |
| 2015/0163811 A1* | 6/2015 | Konstantinou | H04W 76/026 370/329 |
| 2015/0365989 A1* | 12/2015 | Huang | H04W 76/022 370/329 |
| 2016/0088677 A1 | 3/2016 | Sridharan | |
| 2016/0302128 A1* | 10/2016 | Anchan | H04W 36/30 |
| 2017/0064602 A1* | 3/2017 | Kotecha | H04W 28/0289 |

OTHER PUBLICATIONS

International Search Report and Written Opinion dated Sep. 20, 2017 for PCT Application No. PCT/US2017/035298, 9 pages.

\* cited by examiner

VIDEO OVER LTE DATA USAGE METERING

BACKGROUND

Mobile telecommunication devices are integral to the daily lives of most users. Originally, mobile telecommunication devices simply provided two-way voice communication between two people at different locations. For example, a voice call normally involves real-time, duplex, synchronous voice communications through a circuit-switched voice network, in which all participants hear the other participants in real time.

More recently, mobile telecommunication devices are also capable of providing data communication. Such data communication my include sending and receiving text and multimedia messages, access information and services provided by online service providers, as well as exchanging data with other nearby devices. LTE Long-Term Evolution (LTE) is a standard for wireless communication of high-speed data for mobile telecommunication devices. The evolution of LTE led to the development of Voice over LTE (VoLTE), in which two-way voice communication is delivered via data transmission using LTE instead of a circuit-switched voice network. More recently, further evolution of LTE brought about Video over LTE (ViLTE), which is a person-to-person video service that leverage the same control protocols and data transmission backbone as VoLTE. ViLTE technology enables users to make ViLTE calls, i.e., phone calls that provide both audio and video communication, using their mobile telecommunication devices.

As the usage of ViLTE calls become more prevalent, wireless telecommunication providers are faced with the problem of metering ViLTE usage. The metering of ViLTE usage ensures that the use ViLTE calls by a user, which may consume relatively large amounts of data bandwidth, are counted against a total amount of data that is allocated to the user according to a monthly service plan. In this way, the wireless telecommunication providers may control and manage the use of ViLTE calls by users. However, existing LTE governing standards, such as standards promulgated by the $3^{rd}$ Generation Partnership Project (3GPP) organization, do not adequately provide specific details with respect to the implementation of ViLTE metering.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
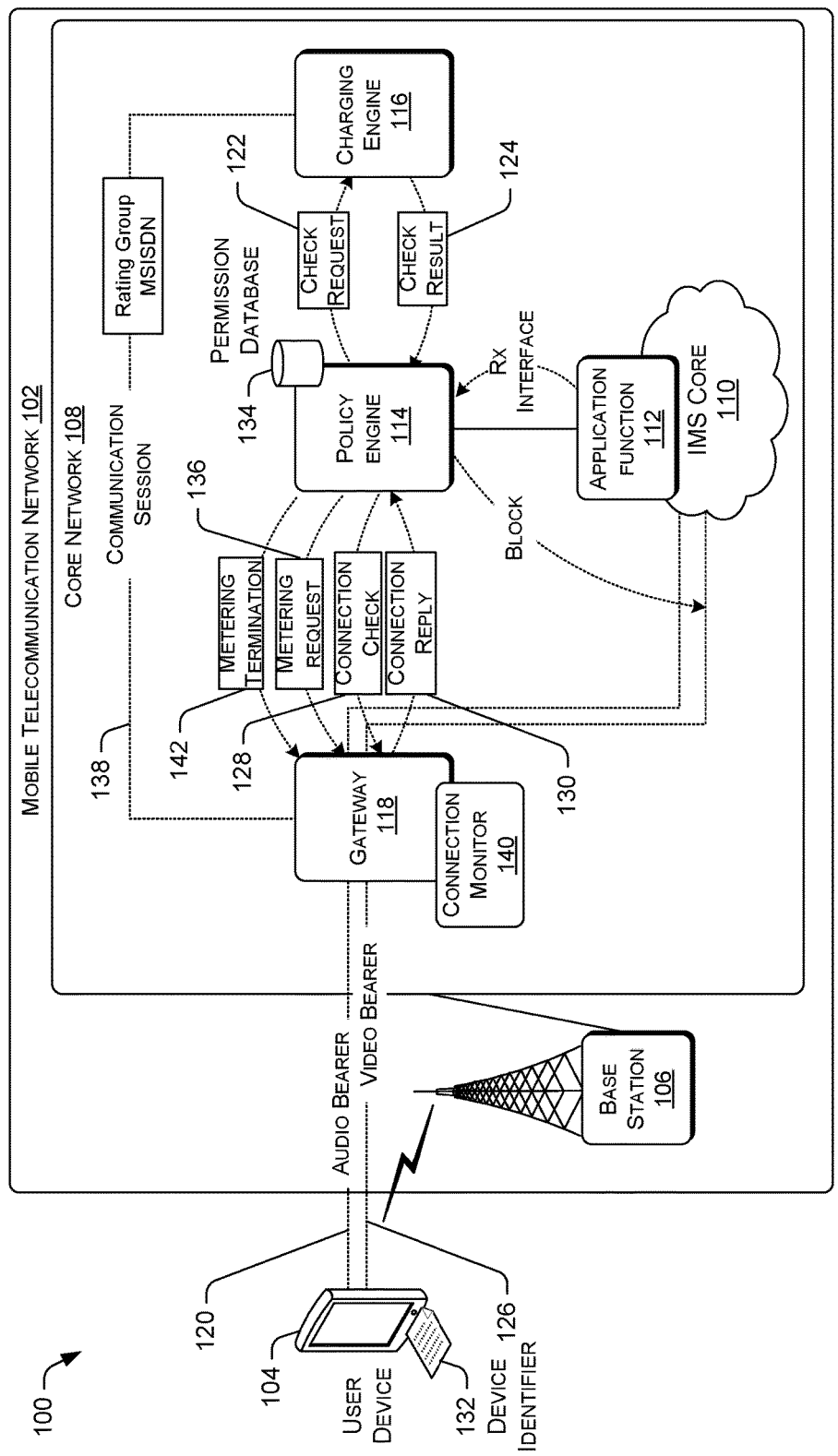
FIG. 1 illustrates an example architecture of a core network in a mobile telecommunication network that implements the metering of Video over LTE (ViLTE) data usage in order to manage the use of ViLTE calls by users.

This disclosure is directed to techniques for metering Video over LTE (ViLTE) data usage by subscribers of a mobile telecommunication network. The metering of ViLTE data usage may be performed for ViLTE calls that are made by the subscribers. Such metering of ViLTE data usage may ensure that the data used by a subscriber during a ViLTE call is counted against a total amount of data that is allocated to the subscriber according to a periodic plan, e.g., a monthly service plan. Further, additional management capabilities for the metering of ViLTE data usage may block a subscriber that has exhausted the allocated data in a periodic billing cycle from making ViLTE calls until the next periodic cycle. The management capabilities may also include controlling whether specific user devices may be used to make multimedia calls, such as video over WLAN calls and ViLTE calls, based on their device identifiers, e.g., international mobile subscriber identities (IMSIs). Other features may include the detection of whether a user device is connected to LTE or a wireless local area network (WLAN), such that ViLTE call metering may be suspended when the user device connects to WLAN instead of LTE. This is because the ViLTE call becomes a video over WLAN call when the user device switches from LTE to the WLAN. In various embodiments, the WLAN may be a Wi-Fi network or another equivalent wireless network that does not use any over-the-air bandwidth resources and network infrastructures of the mobile telecommunication network 102 to transport data via the Internet. However, ViLTE call metering may be activated when the user device connects to LTE instead of WLAN, as the video over WLAN call is then converted back into a ViLTE call.

In at least one embodiment, a request to establish a video bearer between a mobile telecommunication network and a user device for a multimedia call may be received at a policy engine of the mobile telecommunication network. Subsequently, information from a gateway of the mobile telecommunication network may be retrieved. The information may indicate a connection type used by the user device to connect to the mobile telecommunication network. Accordingly, in one instance, the video bearer for a video over WLAN call of the user device may be established without ViLTE data usage metering in response to the user device having a WLAN connection type. In another instance, the video bearer for a ViLTE call of the user device may be established with ViLTE data usage metering in response to the user device having a LTE connection type.

The techniques for metering ViLTE data usage and the performance of ViLTE call management based on such metering may ensure that the consumption of data by ViLTE calls are in line with their recurring service plans. Accordingly, the techniques may prevent the excessive consumption of data by the subscribers during ViLTE calls. Such excessive consumption has the potential to detrimentally affect the ability of other subscribers to access the data services provided by the wireless telecommunication provider. The techniques described herein may be implemented in a number of ways. Example implementations are provided below with reference to the following FIGS. 1-13.

Example Architecture

FIG. 1 illustrates an example architecture of a core network in a mobile telecommunication network for implementing the metering of Video over LTE (ViLTE) data usage in order to manage the use of ViLTE calls by users. The architecture 100 may include a mobile telecommunication network 102 that serves multiple user devices, such as the user device 104. The user device 104 may be a feature phone, a smartphone, a tablet computer, a phablet, an embedded computer system, or any other device that is capable of using the wireless communication services that are provided by the mobile telecommunication network 102 to make ViLTE calls. Because ViLTE calls provides both audio and video communication, ViLTE calls are essentially multimedia calls. The user device 104 is also capable of making video over WLAN calls, which are multimedia calls carried by WLANs.

The mobile telecommunication network 102 may include multiple base stations, such as the base station 106, as well as a core network 108. The mobile telecommunication network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The base stations are responsible handling voice and data traffic between user devices and the core network 108. In some embodiments, the base stations may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area that is referred to as a "cell." The BTS may send RF signals to user devices and receive radio signals from user devices.

The core network 108 may provide telecommunication and data communication services to multiple user devices. For example, the core network 108 may connect the user devices to other telecommunication and data communication networks, such as the Internet and a public switched telephone network (PSTN). Accordingly, data packet communications via the core network 108 and the Internet may support a variety of services. In various embodiments, an IP Multimedia Subsystem (IMS) core 110 may reside in the core network 108 of the mobile telecommunication network 102. The IMS core 110 may include an application function (AF) 112. In various embodiments, the AF 112 may be a Proxy Call Session Control Function (P-CSCF) or an equivalent function. In instances in which the AF 112 is the P-CSCF, the P-CSCF may route incoming SIP messages to an IMS registrar server. The P-CSCF may also safeguard the security of the IMS core 110 by handling Internet Protocol Security (IPSec) for communications that are exchanged by the user devices. In some alternative instances, instead of SIP sessions, the P-CSCF may handle Remote Authentication Dial-In User Service (RADIUS) sessions. The P-CSCF may interact with an Interrogating CSCF (I-CSCF), and a Serving CSCF (S-CSCF). The S-CSCF may communicate with a telephony application server (TAS) that resides in the core network 108. The TAS may route voice and/or data communications within the mobile telecommunication network 102 and with other networks, including public switch telephone networks (PSTNs). For example, the TAS may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth.

The core network 108 may further include a policy engine 114, a charging engine 116, and a gateway 118. The policy engine 114 may be a software component that determines policy and enforces policy rules, and serves to establish calls and allocate bandwidth to call bearers. In various embodiments, the policy engine 114 may be a Policy and Charging Rules Function (PCRF) or another equivalent core network component of the mobile telecommunication network 102. Accordingly, the Policy engine 114 may interface with the AF 112 to handle incoming and outgoing VoLTE and ViLTE calls. The charging engine 116 may enable the mobile telecommunication network 102 to monitor the services, such as data, voice, text, etc., that are used by each subscriber, and charge the subscribers in real-time based on service usage. In various embodiments, the charging engine 116 may be an Online Charging System (OCS) or another equivalent core network component of the mobile telecommunication network 102. The gateway 118 may include one or more servers and related components that are tasked with providing connectivity between the IMS core 110 and the user devices (e.g., the user device 104) by acting as a point of entry and exit for data traffic. In turn, the IMS core 110 may provide the user devices with data access to external packet data networks, such as the networks of other wireless telecommunication providers. Accordingly, the gateway 118 may perform functions such as policy enforcement, packet filtering, packet screening, and/or charging support. In various embodiments, the gateway 118 may be a Packet Data Network Gateway (PGW) or another equivalent core network component of the mobile telecommunication network 102.

In various embodiments, the policy engine 114, the charging engine 116, and the gateway 118 may act in concert to perform the metering and management of ViLTE calls. Such metering and management with respect to Vi LTE calls means that these components behave different than for VoLTE calls. During the initiation of an incoming or outgoing VoLTE call for the user device 104, the AF 112 may send a connection request to the policy engine 114 requesting data bandwidth allocation for a VoLTE call. For example, the AF 112 may send such a request to the policy engine 114 via an IMS Rx interface or another equivalent IMS interface. In turn, the policy engine 114 may send a request to the gateway 118 to establish an audio bearer, which is an audio communication tunnel that carries an audio data stream for the VoLTE call. In response, the gateway 118 may establish an audio bearer 120 between the IMS core 110 and the user device 104 so that the VoLTE call may be connected.

In contrast, during the initiation of an incoming or outgoing ViLTE call for the user device 104, the policy engine 114 may perform several additional steps. Initially, the AF 112 may send a request to the policy engine 114 asking for data bandwidth allocation for the ViLTE call that involves the user device 104. Following the receipt of the request, the policy engine 114 may perform one more checks. In one instance, the policy engine 114 may send a throttle mode check request 122 to the charging engine 116. The throttle mode check request 122 is designed to determine whether the user device 104 is currently in throttle mode. Throttle mode occurs when a subscriber of a user device has used up, i.e., exhausted, the allocated data for a periodic billing cycle (e.g., 5 GB per month). As a result, the user device 104 may be restricted to access data from the mobile telecommunication network 102 at a downgraded data access speed (e.g., 128 Kbps) than a normal available data access speed. In response, the charging engine 116 may send a throttle mode check result 124 to the policy engine 114 that indicates the throttle mode status of the user device 104. Thus, if the throttle mode check result 124 indicates that the user device 104 is currently not in throttled mode, then the policy engine 114 may permit the establishment of a video bearer for the ViLTE call. In particular, the policy engine 114 may send a request to the gateway 118 to establish a video bearer, which is a video communication tunnel that carries video stream data for the ViLTE call. In response, the gateway 118 may establish a video bearer 126 between the IMS core 110 and the user device 104 so that the ViLTE call may be connected. It will be appreciated that any time the gateway 118 establishes a video bearer for ViLTE call, the gateway 118 will also automatically establish an audio bearer. Such automatic establishment of the audio bearer is due to the fact that a ViLTE call by default employs both an audio stream and a video stream.

On the other hand, if the throttle mode check result 124 indicates that the user device 104 is currently in throttled mode, the policy engine 114 may deny the ViLTE call. This is because the policy engine 114 may be equipped with a policy stating that subscribers who exhaust their allocated data in a periodic billing cycle is not entitled to a ViLTE call. Instead, the policy engine 114 may fulfill the original ViLTE call request as a VoLTE call by establishing the audio bearer 120 to connect the call.

In some embodiments, the policy engine 114 may perform a connection type check as a basis for determining whether to perform the throttled mode check. In one scenario, the user device 104 may be connected to the core network 108 of the mobile telecommunication network 102 via a WLAN connection that is provided by a third-party service provider. In an alternative scenario, the user device 104 may be connected to the core network 108 via a LTE connection through a base station of the mobile telecommunication network 102. In at least one embodiment, the policy engine 114 may perform the connection type check by sending a connection check request 128 to the gateway 118. For example, the connection check request 128 may request a 3GPP IP-Can-Type of the user device 104 using a dummy Re-Auth-Request (RAR) command. In response, the gateway 118 may return a connection check reply 130 that indicates the IP-Can-Type of the user device 104 as either LTE or WLAN.

Accordingly, if the user device 104 is connected via a WLAN connection, the policy engine 114 may forego the throttle mode status check. Instead, the policy engine 114 may automatically command the gateway 118 to establish the video bearer 126 for the video call. This is because video calls via the WLAN connection, which may be provided by a third-party, are not ViLTE calls as they do not use any over-the-air bandwidth resources and network infrastructures of the mobile telecommunication network 102. However, if the user device 104 is connected via a LTE connection of the mobile telecommunication network 102, the policy engine 114 may perform the throttle mode status check to ensure that the user device 104 is eligible for ViLTE calls. This is because ViLTE calls over LTE consumes bandwidth that is provided using the over-the-air resources and network infrastructures of the mobile telecommunication network 102.

In another instance, the policy engine 114 may perform a check for the permissibility of multimedia calls for the user device 104. The multimedia calls may include video over WLAN calls and ViLTE calls. In such an instance, the policy engine 114 may check a device identifier 132 of the user device 104 against a permission database 134 that resides with the policy engine 114. In various embodiments, the device identifier 132 may be an international mobile subscriber identity (IMSI), an electronic serial number (ESN), or another identifier that uniquely identifies the user device 104. The permission database 134 may include a list of device identifiers that are blocked from engaging in multimedia calls. In such instances, the user device 104 may be permitted to make a multimedia call when the device identifier 132 is not on the list of the permission database 134. Alternatively, the permission database 134 may include a list of device identifiers that are permitted to make multimedia calls. In these instances, the user device 104 may be permitted to make a multimedia call when the device identifier 132 is on the list of the permission database 134. The list may be created or updated based on input from subscribers. For example, the permission database 134 may be modified by subscribers via a web portal that is provided by the mobile telecommunication network 102. The web portal may be provided by a web application or a server-side application that is hosted by the one or more servers of the core network 108. In this way, a subscriber may ensure that the subscriber or another subscriber on the same account is unable to use an excessive amount of the allocate data during the periodic billing cycle.

For example, the device identifier 132 of the user device 104 may be sent by the AF 112 to the policy engine 114 as a part of the connection request. Following receipt of device identifier 132, the policy engine 114 may compare the device identifier 132 to the list of device identifiers in the permissions database 134. Accordingly, if a device identifier is found to be disallowed, the policy engine 114 may block the establishment of the video bearer 126 for the multimedia call, but permit the establishment of the audio bearer 120 by the gateway 118 for a VoLTE call. Otherwise, the policy engine 114 may request that the gateway 118 establish both the audio bearer 120 and the video bearer 126 for the multimedia call.

In various embodiments, the policy engine 114 is configured to meter ViLTE calls that are made by the user device 104 over the LTE connection. The metering of a ViLTE call means that data used by the user device 104 for the ViLTE call over the LTE connection is tracked and counted against the amount of allocated data for the user device 104 in each periodic billing cycle. For example, if the user device 104 is on a service plan that provides 5 GB of data per month for use by the user device 104, the amount of data used by the user device 104 for ViLTE calls is counted against this 5 GB allocation. The 5 GB of data may belong to a common data bucket that is shared by all data usages, e.g., web browsing, e-mail, web application usage, and/or so forth, as well as ViLTE calls. In other words, the service subscription plans provided to user devices by the mobile telecommunication network 102 may not provide separate categories of data usage, such as a separate category just for data used by ViLTE calls.

The policy engine 114 may perform such metering of ViLTE calls by acting in coordination with the gateway 118 and the charging engine 116. Following the establishment of the video bearer 126, the policy engine 114 may send a metering request 136 to the gateway 118. For example, the metering request may be in the form of an Online AVP code (e.g., AVP code 100 indicating that a charging rule is to be enabled), or another equivalent code. Upon receiving the metering request 136, the gateway 118 may establish a communication session 138 with the charging engine 116. The communication session 138 may be in the form of a Gy interface or another equivalent interface. The gateway 118 transmits a charging code (e.g., Rating Group (RG) 200) and a user device identifier (e.g., a MSISDN) of the user device 104 to the charging engine 116 via the communication session. In turn, the charging engine 116 may use the user device identifier to charge data that is used for the ViLTE call against the allocated data for the user device 104 during a current periodic billing cycle.

The charging engine 116 may track the usage of data for the ViLTE call by the user device 104 in real-time. Thus, the charging engine 116 may send a notification message to the policy engine 114 upon determining that the allocated data for the user device 104 is exhausted by the ViLTE call. The notification message to the policy engine 114 may be sent via the communication session 138 that connects the charging engine 116 to the gateway 118. In turn, the policy engine 114 may be configured to behave differently upon receiving the notification message in different instances. In some instances, the policy engine 114 may immediately send a video bearer termination request to the gateway 118 while the ViLTE call is still in progress. Following the gateway 118 terminating the video bearer 126 based on the termination request, the ViLTE call may be converted into a VoLTE call. In other instances, the policy engine 114 may be configured to ignore the notification, such that the user device 104 is permitted to complete the ViLTE call despite the exhausted data allocation.

While such metering for a ViLTE call is performed when the user device 104 is connected via LTE, no such metering is performed by the policy engine 114 when the user device 104 is connected via WLAN for a video call. This is due to the fact that video calls via the WLAN connection, unlike ViLTE calls, do not use any over-the-air bandwidth that is provided by mobile telecommunication network 102. Thus, in a scenario in which the user device 104 is connected via WLAN when a video call is initiated, no metering request 136 is sent by the policy engine 114 to the gateway 118. Consequently, no communication session 138 is formed between the gateway 118 and the charging engine 116 for the purpose initiating metering by the charging engine 116.

The policy engine 114 may be further configured to deal with the user device 104 switching from a LTE connection to a WLAN connection, and vice versa, between the initiation of a ViLTE call and the completion of the call. In order to do, the policy engine 114 may rely on a connection monitor 140 that executes in the gateway 118. The connection monitor 140 is an algorithm programmed to automatically detect a change in the connection type of the user device 104 (e.g., IP-Can-Type) as long as the device is connected to the core network 108. Following such a detection, the connection monitor 140 may send a connection type change notification to the policy engine 114.

Accordingly, in instances in which the ViLTE call is initiated when the user device 104 is on LTE, the connection monitor 140 may detect a change in the connection type of the user device 104 to WLAN. This change in connection type means that the ViLTE call has become a video over WLAN call. As a result, the connection monitor 140 may send a connection type change notification to the policy engine 114 indicating the change from LTE to WLAN. In response to the connection type change notification, the policy engine 114 may send a metering termination request 142 to the gateway 118. In turn, the gateway 118 may terminate the communication session 138 between the gateway 118 and the charging engine 116. This termination may result in the charging engine 116 stopping the data usage tracking for the ViLTE call at the moment the ViLTE call becomes the video over WLAN call.

On other hand, in instances in which a video call is initiated when the user device 104 is on a WLAN connection, the connection monitor 140 may detect a change in the connection type of the user device 104 to LTE. This change in connection type means that the video over WLAN call has become a ViLTE Call. As a result, the connection monitor 140 may send a connection type change notification to the policy engine 114 indicating the change from WLAN to LTE. Since no ViLTE data usage metering is in effect while the user device 104 is initially using WLAN, such a change means that policy engine 114 is prompted to turn on metering. Accordingly, the policy engine 114 may send a metering request 136 to the gateway 118. Upon receiving the metering request 136, the gateway 118 may establish the communication session 138 with the charging engine 116 for the transmitting of the charging code and the device identifier of the user device 104. In turn, the charging engine 116 may use the user device identifier to charge data that is used for the ViLTE call against the allocated data for the user device 104 during a current periodic billing cycle. By applying these procedures, the activation and deactivation of ViLTE data usage metering may occur multiple times as the connection type of the user device 104 switches back and forth between WLAN and LTE during a single call.

Example Computing Device Components

Figure 2:
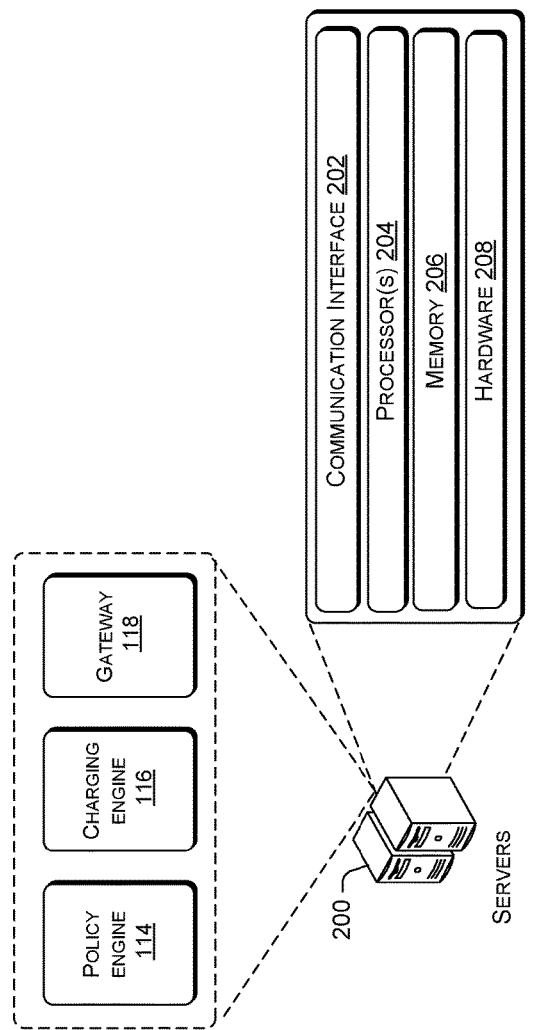
FIG. 2 is a block diagram showing various components of one or more computing devices that support the core network of the mobile telecommunication network for implementing ViLTE metering.

FIG. 2 is a block diagram showing various components of one or more computing devices that support the core network of the mobile telecommunication network for implementing ViLTE metering. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In various embodiments, the processors 304 and the memory 306 of the computing devices 200 may execute the policy engine 114, the charging engine 116, the gateway 118, as well as other components of the core network 108.

Example Processes

Figure 3:
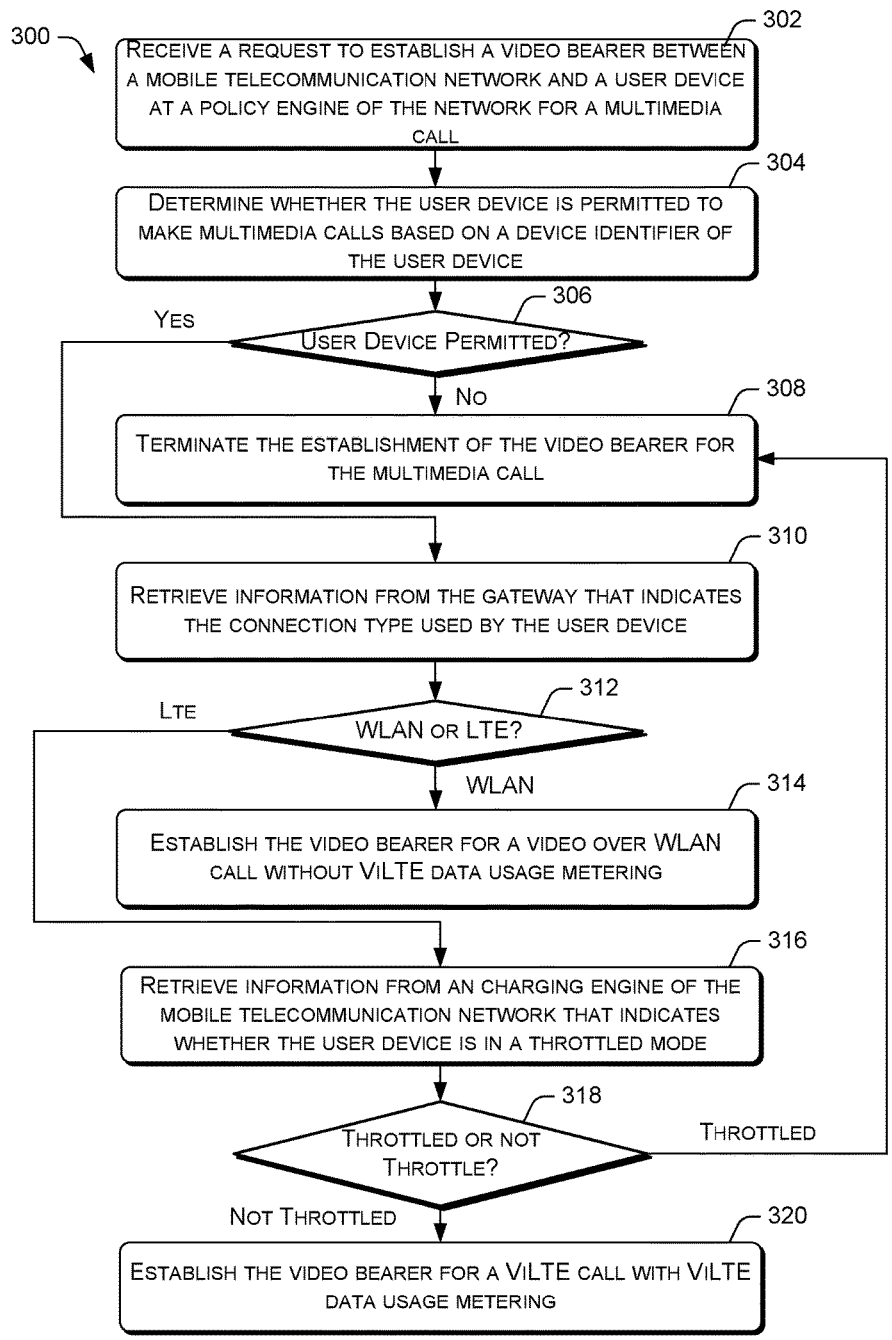
FIG. 3 is a flow diagram of an example process for managing the establishment of a video bearer for a ViLTE call based on multiple factors.
Figure 4:
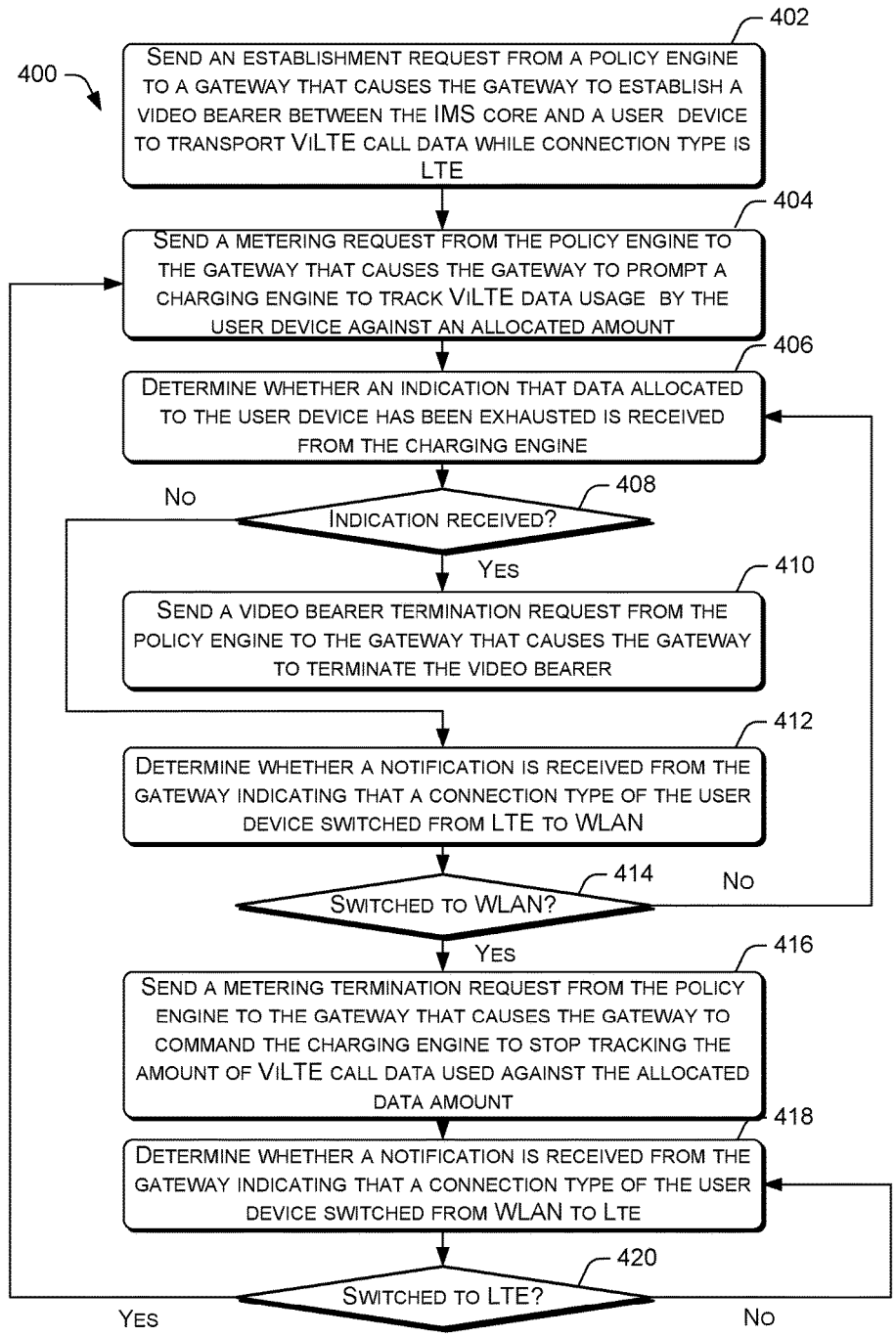
FIG. 4 is a flow diagram of an example process for managing a video bearer and ViLTE metering for a ViLTE call that is initially carried over a LTE connection.
Figure 5:
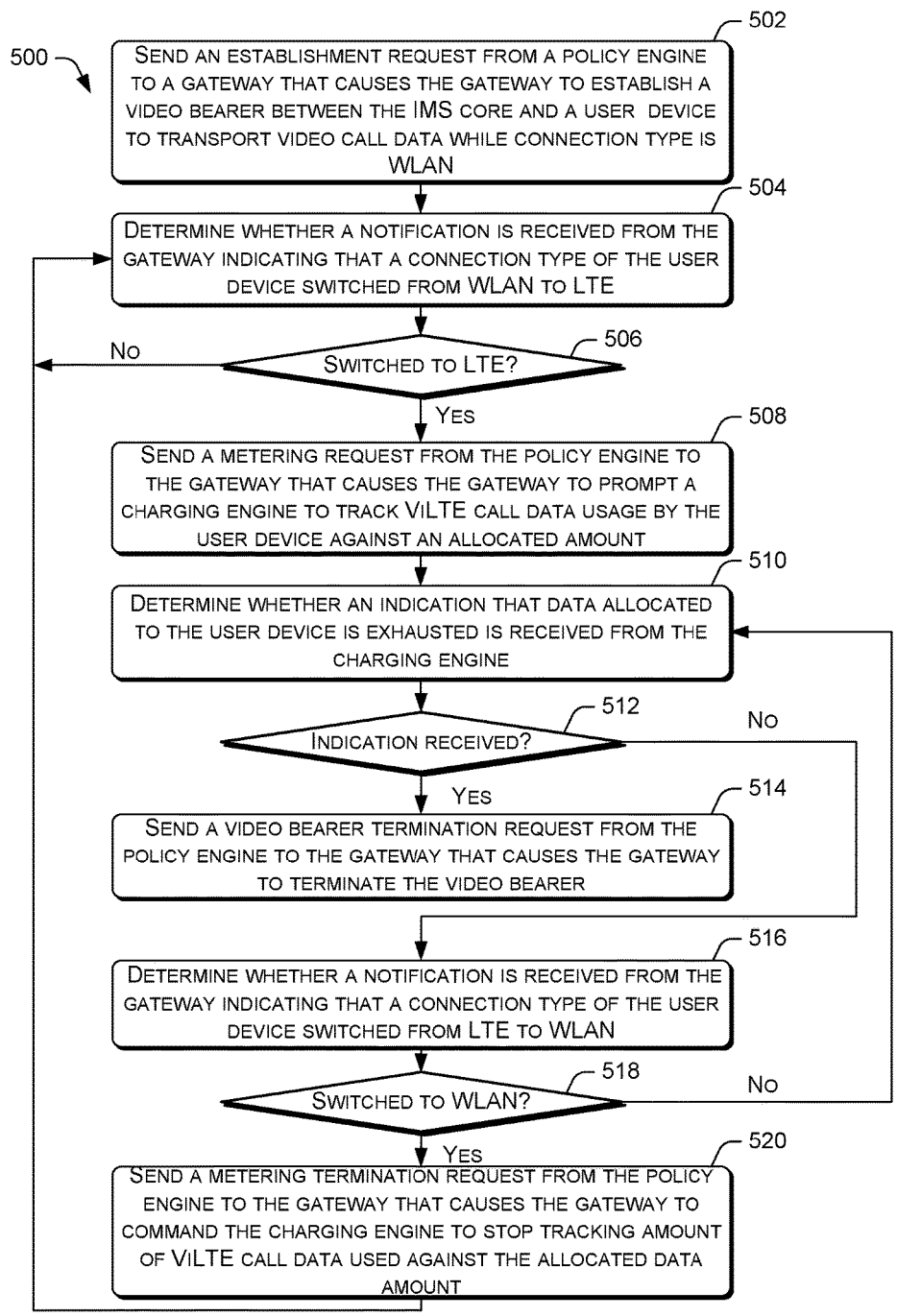
FIG. 5 is a flow diagram of an example process for managing a video bearer and ViLTE metering for a ViLTE call that is initially carried over a WLAN connection.

FIGS. 3-5 present illustrative processes 300-500 for metering Video over LTE (ViLTE) data usage by subscribers of a mobile telecommunication network. Each of the processes 300-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 300-500 are described with reference to the architecture 100 of FIG. 1.

FIG. 3 is a flow diagram of an example process 300 for managing the establishment of a video bearer for a multimedia call based on multiple factors. At block 302, the policy engine 114 may receive a request to establish a video stream between the 102 wireless communication network and the user device 104. In various embodiments, the AF 112 may send the request to the policy engine 114 during the initiation of an incoming or outgoing multimedia call for the user device 104, in which the multimedia call may be either a ViLTE call or a video over LAN call.

At block 304, the policy engine 114 may determine whether the user device 104 is permitted to make multimedia calls based on the device identifier 132 of the user device 104. In various embodiments, the policy engine 114 may check the device identifier 132 of the user device 104 against a permission database 134 that resides with the policy engine 114. The permission database 134 may include a list of device identifiers that are blocked from engaging in multimedia calls. Alternatively, the permission database 134 may include a list of device identifiers that are permitted to make multimedia calls. Accordingly, at decision block 306, if the policy engine 114 determines that the user device 104 is not permitted to make multimedia calls ("no" at decision block 306), the process 300 may proceed to block 308. At block 308, the policy engine 114 may terminate the establishment of the video bearer for the multimedia call. The termination may involve the policy engine 114 taking no further action with respect to the video bearer.

However, if the policy engine 114 determines that the user device 104 is permitted to make the multimedia calls ("yes" at decision block 306), the process 300 may proceed to block 310. At block 310, the policy engine 114 may retrieve information from the gateway 118 that indicates the connection type used by the user device 104 for the multimedia call. In various embodiments, the policy engine 114 may perform the connection type check by sending a connection check request 128 to the gateway 118 to request the IP-Can-Type of the user device 104. In response, the gateway 118 may return a connection check reply 130 that indicates the IP-Can-Type of the user device 104 as either LTE or WLAN. Accordingly, at decision block 312, if the policy engine 114 determines that the connection type of the user device 104 is WLAN, the process 300 may proceed to block 314. At block 314, the policy engine 114 may establish the video bearer for a video over WLAN call without ViLTE data usage metering.

However, if the policy engine 114 determines at decision block 312 that the connection type of the user device 104 is LTE, the process 300 may proceed to block 316. At block 316, the policy engine 114 may retrieve information from the charging engine 116 that indicates whether the user device is in a throttled mode. In various embodiments, the policy engine 114 may send the throttle mode check request 122 to the charging engine 116. In response, the charging engine 116 may send the throttle mode check result 124 to the policy engine 114 that indicates the throttle mode status of the user device 104.

Thus, at decision block 318, if the retrieved information indicates that the user device 104 is in the throttled mode, the process 300 may loop back to block 308. Once again, the policy engine 114 may terminate the establishment of the video bearer for the multimedia call at block 308. However, if the retrieve information indicates that the user device 104 is not in throttled mode, the process 300 may proceed to block 320. At block 320, the policy engine 114 may establish the video bearer for the ViLTE call with ViLTE data usage metering.

FIG. 4 is a flow diagram of an example process 400 for managing a video bearer and ViLTE metering for a ViLTE call that is initially carried over a LTE connection. At block 402, the policy engine 114 may send an establishment request to the gateway 118 that causes the gateway 118 to establish the video bearer 126. The video bearer 126 may be established between the IMS core 110 and the user device to transport ViLTE call data while the connection type is LTE.

At block 404, the policy engine 114 may send a metering request to the gateway 118 that causes the gateway 118 to prompt the charging engine 116 to track ViLTE data usage by the user device 104 against an allocated amount for the current periodic billing cycle. In various embodiments, upon receiving the metering request, the gateway 118 may establish a communication session 138 with the charging engine 116 to transmit a charging code and a user device identifier. In turn, the charging engine 116 may use the user device identifier to charge data that is used for ViLTE against the allocated data for the user device 104 during a current periodic billing cycle.

At block 406, the policy engine 114 may determine whether an indication that the data allocated to the user device 104 in the current periodic billing cycle has been exhausted is received from the charging engine 116. Accordingly, at decision block 408, if the policy engine 114 determines that such an indication of data exhaustion is received ("yes" at decision block 408), the process 400 may proceed to block 410. At block 410, the policy engine 114 may send a video bearer termination request to the gateway 118 that causes the gateway to terminate the video bearer 126.

However, if the policy engine 114 determines that no such indication of data exhaustion is received ("no" at decision block 408), the process 400 may proceed to block 412. At block 412, the policy engine 114 may determine whether a notification is received from the gateway 118 indicating that a connection type of the user device switched from LTE to WLAN. In various embodiments, the policy engine 114 may receive such a notification of connection type change from the connection monitor 140. Accordingly, if the policy engine 114 determines that the connection type of the user device 104 did not switch to WLAN at decision block 414, the process 400 may loop back to block 406 so that the policy engine 114 may determine whether an indication that the data allocated to the user device 104 in the current periodic billing cycle has been exhausted. However, if the policy engine 114 determines that the connection type of the user device 104 switched to WLAN at decision block 414, the process 400 may proceed to block 416. At block 416, the policy engine 114 may send a metering termination request from the policy engine 114 to the gateway 118. The metering termination request may cause the gateway 118 to command the charging engine 116 to stop tracking the amount of ViLTE call data used against the allocated data amount for the periodic billing cycle. In various embodiments, the gateway 118 may terminate the communication session 138 between the gateway 118 and the charging engine 116 in response to the metering termination request. The termination of the communication session 138 may result in the charging engine 116 stopping the data usage tracking as the ViLTE call has become a video over WLAN call.

At block 418, the policy engine 114 may determine whether a notification is received from the gateway 118 indicating that a connection type of the user device switched from WLAN to LTE. In various embodiments, the policy engine 114 may receive such a notification of connection type change from the connection monitor 140. Accordingly, at decision block 420, if the policy engine 114 determines that the connection type of the user device 104 switched to LTE, the process 400 may loop back to block 404. In this way, the policy engine 114 may cause the gateway 118 to prompt the charging engine 116 to track ViLTE data usage by the user device 104 against the allocated amount for the current periodic billing cycle, as the video over WLAN call has reverted back to being a ViLTE call. However, if the policy engine 114 determines that the connection type of the user device 104 did not switch to LTE, the process 400 may loop back to block 418.

FIG. 5 is a flow diagram of an example process 500 for managing a video bearer and ViLTE metering for a video call that is initially carried over a WLAN connection. At block 502, the policy engine 114 may send an establishment request to the gateway 118 that causes the gateway 118 to establish the video bearer 126. The video bearer 126 may be established between the IMS core 110 and the user device to transport video call data while the connection type is WLAN. At block 504, the policy engine 114 may determine whether a notification is received from the gateway 118 indicating that a connection type of the user device switched from WLAN to LTE. In various embodiments, the policy engine 114 may receive such a notification of connection type change from the connection monitor 140. Accordingly, at decision block 506, if the policy engine 114 determines that the connection type of the user device 104 did not switch to LTE, the process 500 may loop back to block 504. However, if the policy engine 114 determines that the connection type of the user device 104 switched to LTE, in other words, the video over WLAN call has become a ViLTE call, the process 500 may proceed to block 508.

At block 508, the policy engine 114 may send a metering request to the gateway 118 that causes the gateway 118 to prompt the charging engine 116 to track ViLTE data usage by the user device 104 against an allocated amount for the current periodic billing cycle. In various embodiments, upon receiving the metering request, the gateway 118 may establish a communication session 138 with the charging engine 116 to transmit a charging code and a user device identifier. In turn, the charging engine 116 may use the user device identifier to charge data that is used for ViLTE against the allocated data for the user device 104 during a current periodic billing cycle.

At block 510, the policy engine 114 may determine whether an indication that the data allocated to the user device 104 in the current periodic billing cycle has been exhausted is received from the charging engine 116. Accordingly, at decision block 512, if the policy engine 114 determines that such an indication of data exhaustion is received, the process 500 may proceed to block 514. At block 514, the policy engine 114 may send a video bearer termination request to the gateway 118 that causes the gateway to terminate the video bearer 126.

However, if the policy engine 114 determines that no such indication of data exhaustion is received ("no" at decision block 512), the process 500 may proceed to block 516. At block 516, the policy engine 114 may determine whether a notification is received from the gateway 118 indicating that a connection type of the user device switched from LTE to WLAN. In various embodiments, the policy engine 114 may receive such a notification of connection type change from the connection monitor 140. Accordingly, at decision block 518, if the policy engine 114 determines that the connection type of the user device 104 did not switch to WLAN, the process 500 may loop back to block 510 so that the policy engine 114 may determine whether an indication that the data allocated to the user device 104 in the current periodic billing cycle has been exhausted. However, if the policy engine 114 determines that the connection type of the user device 104 switched to WLAN at decision block 518, which means that the ViLTE call reverted back to being a video over WLAN call, the process 500 may proceed to block 520.

At block 520, the policy engine 114 may send a metering termination request from the policy engine 114 to the gateway 118. The metering termination request may cause the gateway 118 to command the charging engine 116 to stop tracking the amount of ViLTE call data used against the allocated data amount for the periodic billing cycle. In various embodiments, the gateway 118 may terminate the communication session 138 between the gateway 118 and the charging engine 116 in response to the metering termination request. The termination of the communication session 138 may result in the charging engine 116 stopping the data usage tracking for the reverted video over WLAN call.

Figure 6:
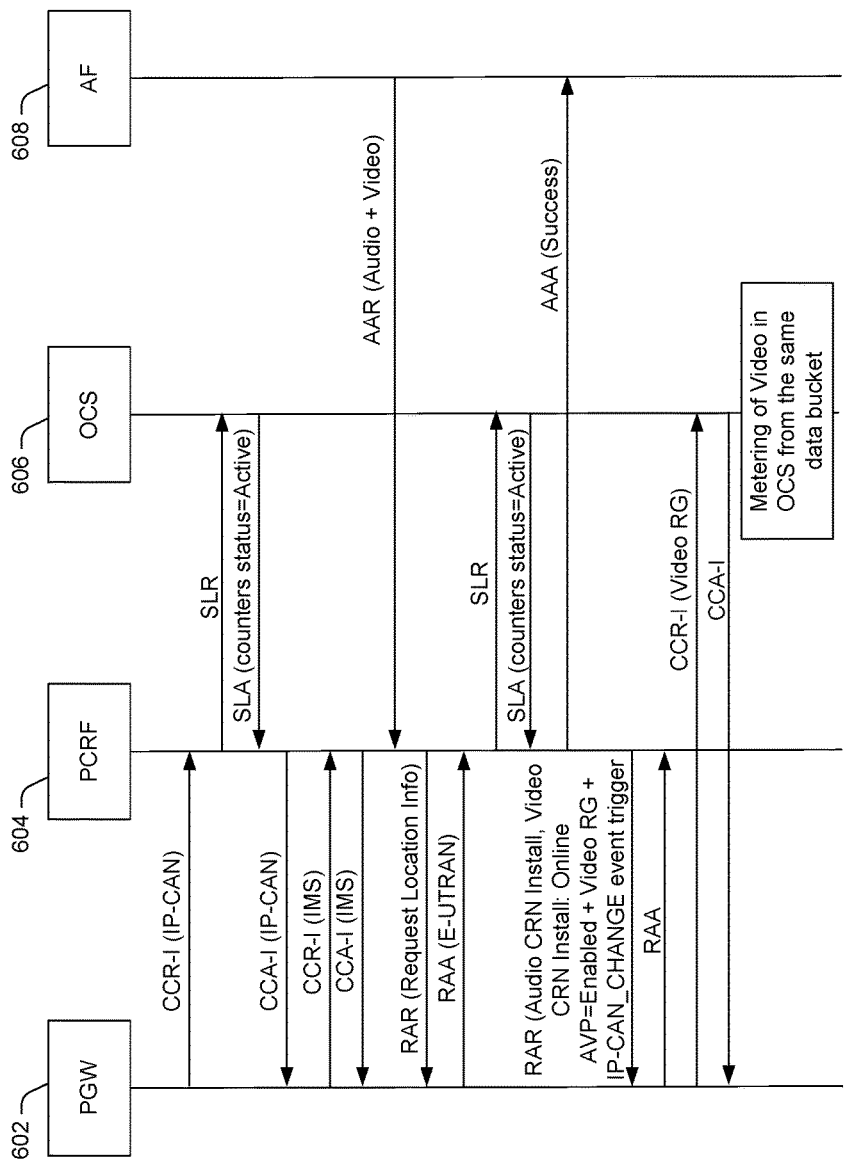
FIG. 6 is a block diagram showing an example call flow for handling a ViLTE call over a LTE connection when a user device is in un-throttled mode.

FIG. 6 is a block diagram showing an example call flow 600 for handling a ViLTE call over a LTE connection when a user device is in un-throttled mode. The example call flow 600 illustrates the communications that are sent between the various components of the mobile telecommunication network 102, in which the components may include a PGW 602, a PCRF 604, an OCS 606, and an AF 608. By communicating with the PGW 602, the PCRF 604 may determine that the user device is not in throttled mode (counters status=active) while on a LTE connection (e.g., E-UTRAN status in response to a location information request). The PCRF 604 and the PGW 602 may further exchange messages to establish an audio bearer (e.g., Audio CRN install) and a video bearer (e.g., Video CRN install) for the ViLTE call of the user device. Subsequently, the PGW 602 and the OCS 606 may further exchange communication to establish the metering of ViLTE data usage from a common data bucket that is shared by all data usages of the user device.

Figure 7:
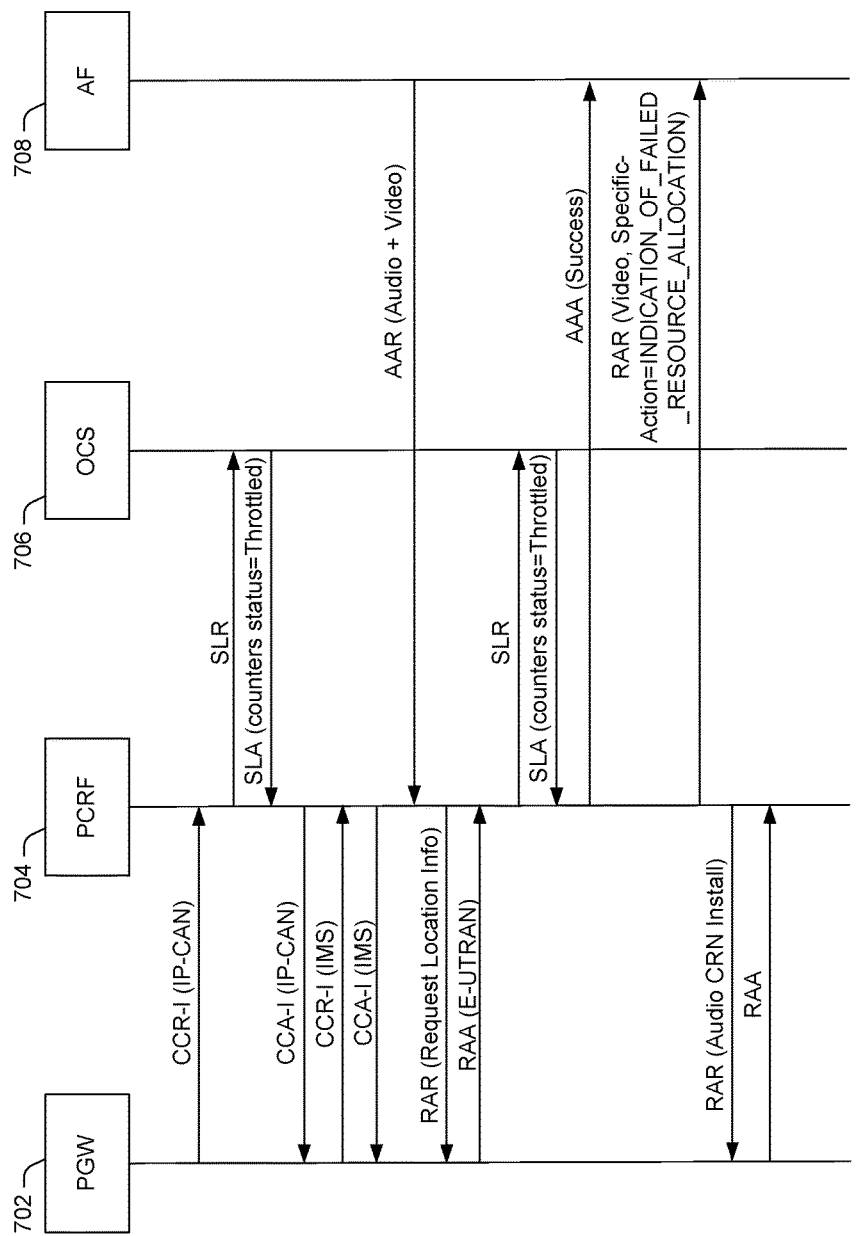
FIG. 7 is a block diagram showing an example call flow for establishing a ViLTE call that is converted to a VoLTE call due to the user device being in an initial throttled mode while on the LTE connection.

FIG. 7 is a block diagram showing an example call flow 700 for establishing a ViLTE call that is converted to a VoLTE call due to the user device being in an initial throttled mode while on the LTE connection. The example call flow 700 illustrates the communications that are sent between the various components of the mobile telecommunication network 102, in which the components may include a PGW 702, a PCRF 704, an OCS 706, and an AF 708. The communications may result in the PCRF 704 receiving communications indicating that the user device is in a throttled mode (e.g., counters status=throttled) while on a LTE connection (e.g., E-UTRAN status in response to a location information request). Accordingly, the PCRF 704 may command the PGW 702 to establish an audio bearer (e.g., Audio CRN install), but no video bearer. In this way, the user device is able to make a VoLTE call but not a ViLTE call.

Figure 8:
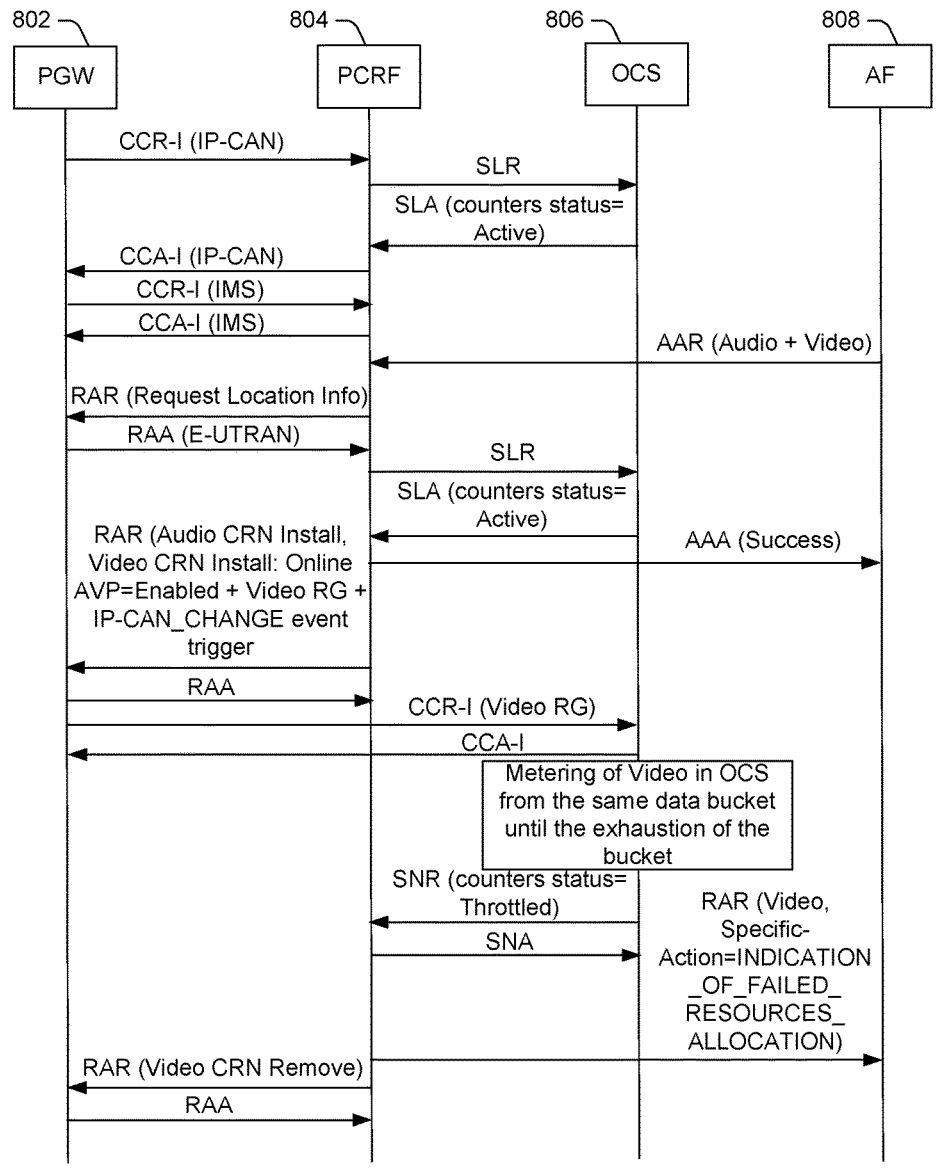
FIG. 8 is a block diagram showing an example call flow for handling a ViLTE call that is converted to a VoLTE call in mid-session due to the user device entering a throttled mode while on the LTE connection.

FIG. 8 is a block diagram showing an example call flow 800 for handling a ViLTE call that is converted to a VoLTE call in mid-session due to the user device entering a throttled mode while on the LTE connection. The example call flow 800 illustrates the communications that are sent between the various components of the mobile telecommunication network 102, in which the components may include a PGW 802, a PCRF 804, an OCS 806, and an AF 808. By communicating with the PGW 802, the PCRF 804 may determine that the user device is on a LTE connection (e.g., E-UTRAN status in response to a location information request) and not in throttled mode (e.g., counters status=active). Accordingly, the PCRF 804 and the PGW 802 may exchange messages to establish an audio bearer (e.g., Audio CRN install) and a video bearer (e.g., Video CRN install) for the ViLTE call of the user device.

Additionally, the PGW 802 and the OCS 806 may exchange communication to establish the metering of ViLTE data usage from a common data bucket that is shared by all data usages of the user device. However, once the PCRF 808 is informed that data in the common data bucket is used up (e.g. counters status=throttled), the PCRF 804 may command the PGW 802 to terminate the video bearer (e.g., video CRN remove).

Figure 9:
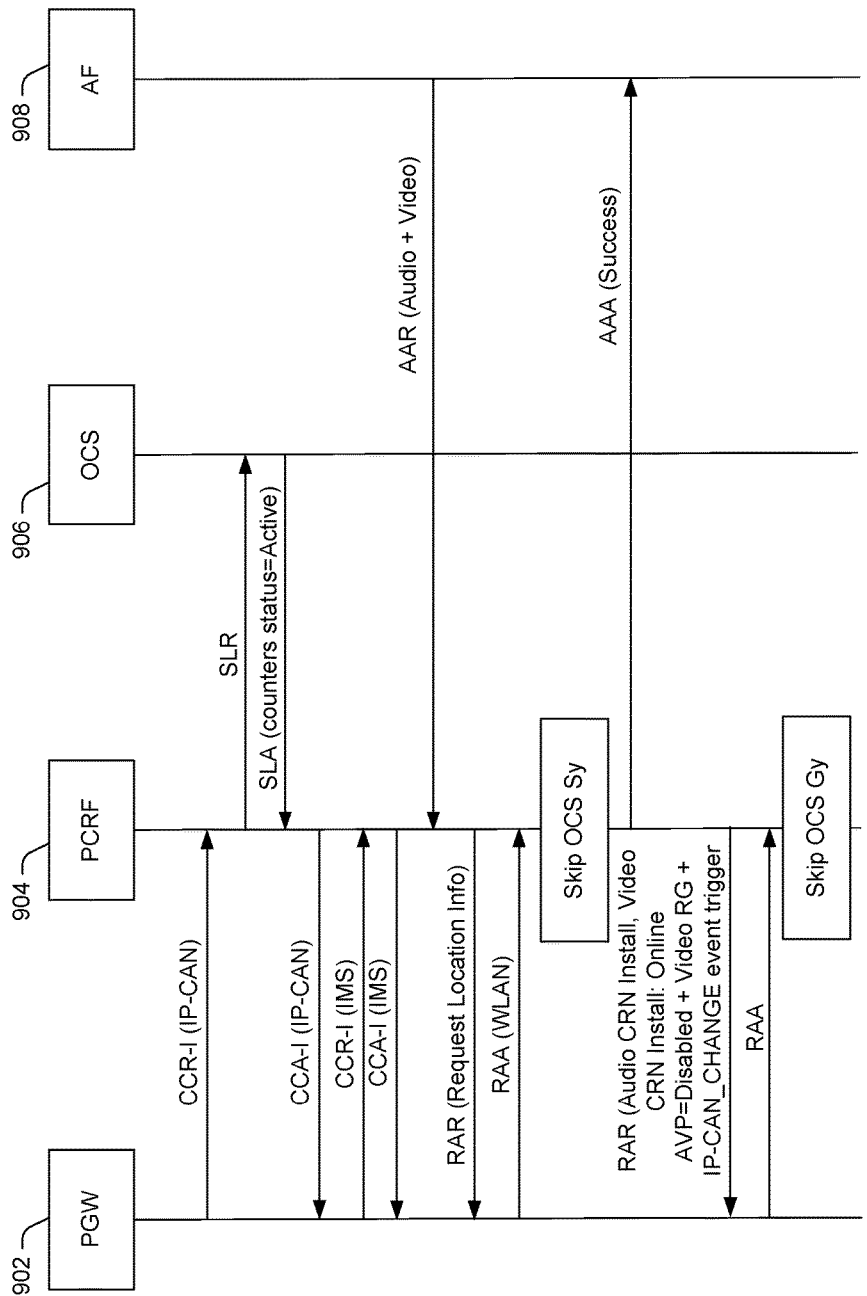
FIG. 9 is a block diagram showing an example call flow for handling a video over a WLAN connection call when the user device is in un-throttled mode.

FIG. 9 is a block diagram showing an example call flow 900 for handling a video over a WLAN connection call when the user device is in un-throttled mode. The example call flow 900 illustrates the communications that are sent between the various components of the mobile telecommunication network 102, in which the components may include a PGW 902, a PCRF 904, an OCS 906, and an AF 908. The communications may result in the PCRF 904 receiving messages that indicate the user device is not in throttled mode (e.g., counters status=active) while on a WLAN connection (e.g., WLAN in response to a location information request). Accordingly, the PCRF 904 may command the PGW 902 to establish an audio bearer (e.g., Audio CRN install) and a video bearer (e.g., Video CRN install). Since the user device is using a WLAN connection, no ViLTE data usage metering is performed (e.g., PCRF 904 skips OCS Sy).

Figure 10:
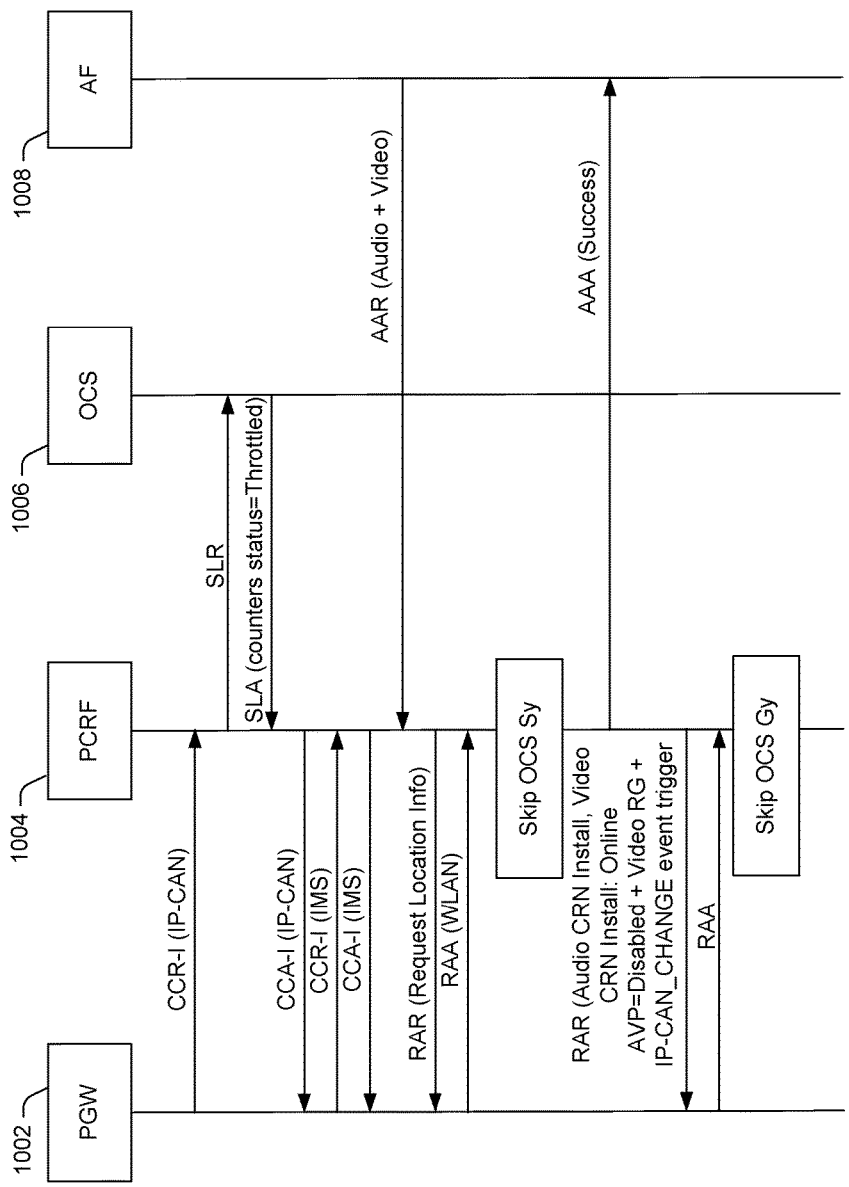
FIG. 10 is a block diagram showing an example call flow for handling a video over a WLAN connection call when the user device is in an initial throttled mode.

FIG. 10 is a block diagram showing an example call flow 1000 or handling a video over a WLAN connection call when the user device is in an initial throttled mode. The example call flow 1000 illustrates the communications that are sent between the various components of the mobile telecommunication network 102, in which the components may include a PGW 1002, a PCRF 1004, an OCS 1006, and an AF 1008. The communications may result in the PCRF 704 receiving messages that indicate the user device is in throttled mode (e.g., counters status=throttled) while on a WLAN connection (e.g., WLAN in response to a location information request). Accordingly, the PCRF 1004 may command the PGW 1002 to establish an audio bearer (e.g., Audio CRN install) and a video bearer (e.g., Video CRN install). Since the user device is using a WLAN connection, no ViLTE data usage metering is performed (e.g., PCRF 1004 skips OCS Sy).

Figure 11:
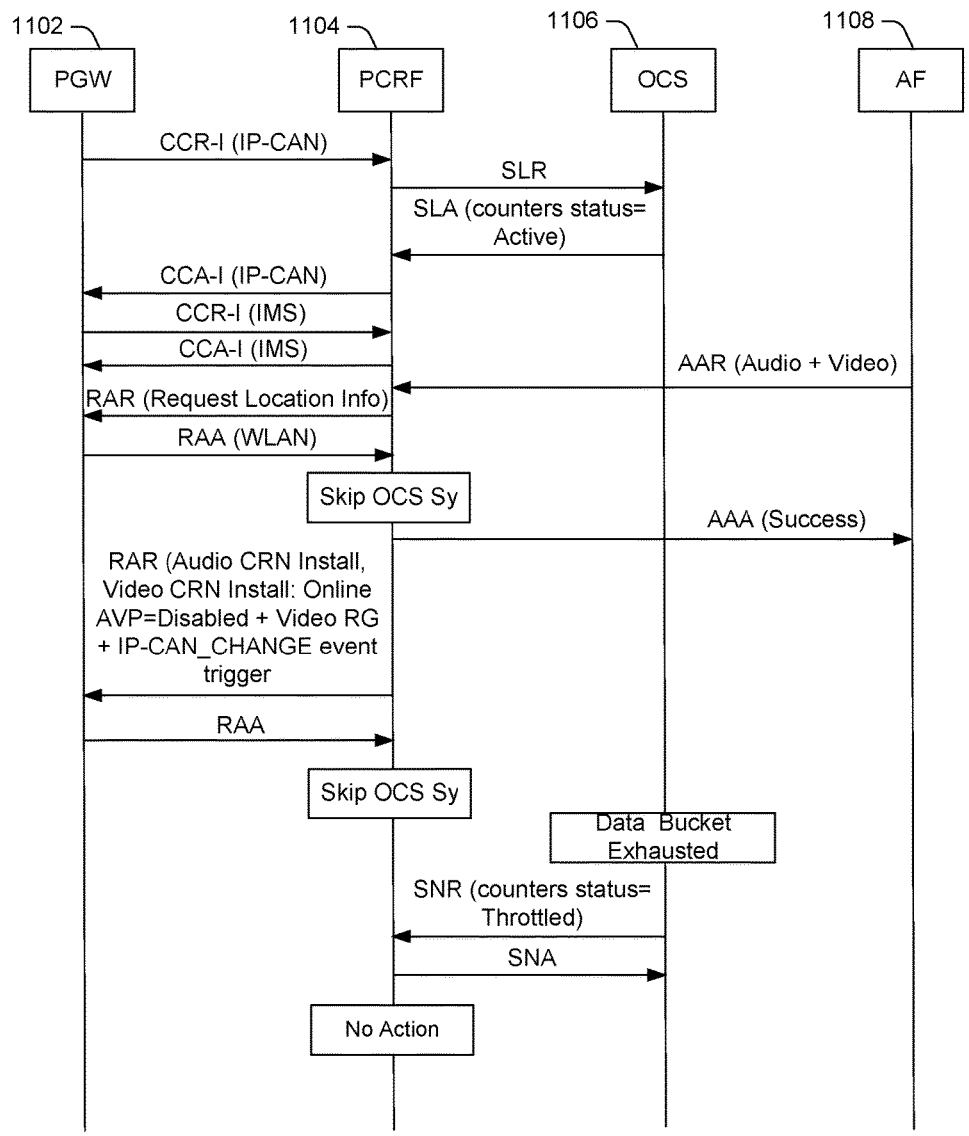
FIG. 11 is a block diagram showing an example call flow for handling a video over a WLAN connection call when the user device transitions from an initial un-throttled mode to a throttled mode in mid-session.

FIG. 11 is a block diagram showing an example call flow 1100 for handling a video over a WLAN connection call when the user device transitions from an initial un-throttled mode to a throttled mode in mid-session. The example call flow 1100 illustrates the communications that are sent between the various components of the mobile telecommunication network 102, in which the components may include a PGW 1102, a PCRF 1104, an OCS 1106, and an AF 1108. The communications may result in the PCRF 1104 receiving messages that indicate the user device is not in throttled mode (e.g., counters status=active) while on a WLAN connection (e.g., WLAN in response to a location information request). Accordingly, the PCRF 1104 may command the PGW 1102 to establish an audio bearer (e.g., Audio CRN install) and a video bearer (e.g., Video CRN install). Since the user device is using a WLAN connection, no ViLTE data usage metering is performed (e.g., PCRF 1104 skips OCS Sy). Subsequently, the PCRF 1104 may receive notification that the user device has entered into a throttled mode (e.g., counters status=throttled) when data in a common bucket is exhausted. However, because the user device is using a WLAN connection, the PCRF 1104 does not take any action and allows the video over WLAN call to continue.

Figure 12:
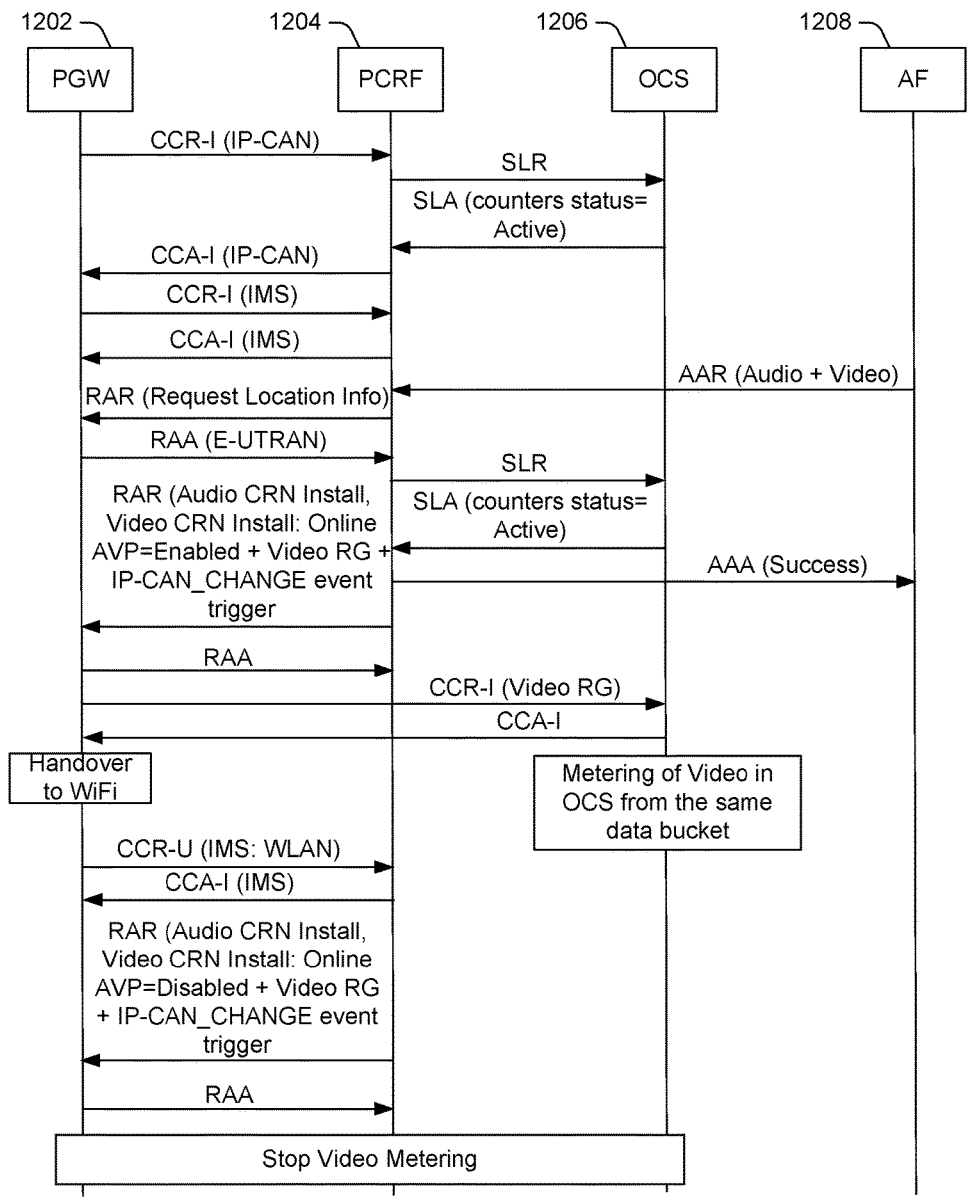
FIG. 12 is a block diagram showing an example call flow for terminating the metering of ViLTE data usage when a ViLTE call on a LTE connection transitions to a video call using a WLAN connection.

FIG. 12 is a block diagram showing an example call flow 1200 for terminating the metering of ViLTE data usage when a ViLTE call on a LTE connection transitions to a video call using a WLAN connection. The example call flow 1200 illustrates the communications that are sent between the various components of the mobile telecommunication network 102, in which the components may include a PGW 1202, a PCRF 1204, an OCS 1206, and an AF 1208. By communicating with the PGW 1202, the PCRF 1204 may determine that the user device is on a LTE connection (e.g., E-UTRAN status in response to a location information request) and not in throttled mode (e.g., counters status=active). The communications may further include requests and responses that result in the establishment of an audio bearer (e.g., Audio CRN install) and a video bearer (e.g., Video CRN install) for the ViLTE call of the user device. The communications of the example call flow 800 may further establish the metering of ViLTE data usage from a common data bucket that is shared by all data usages of the user device. However, once the PCRF 1208 is informed by the PGW 1202 that the user device has switched to a WLAN connection, the PCRF 1208 may stop ViLTE data usage metering.

Figure 13:
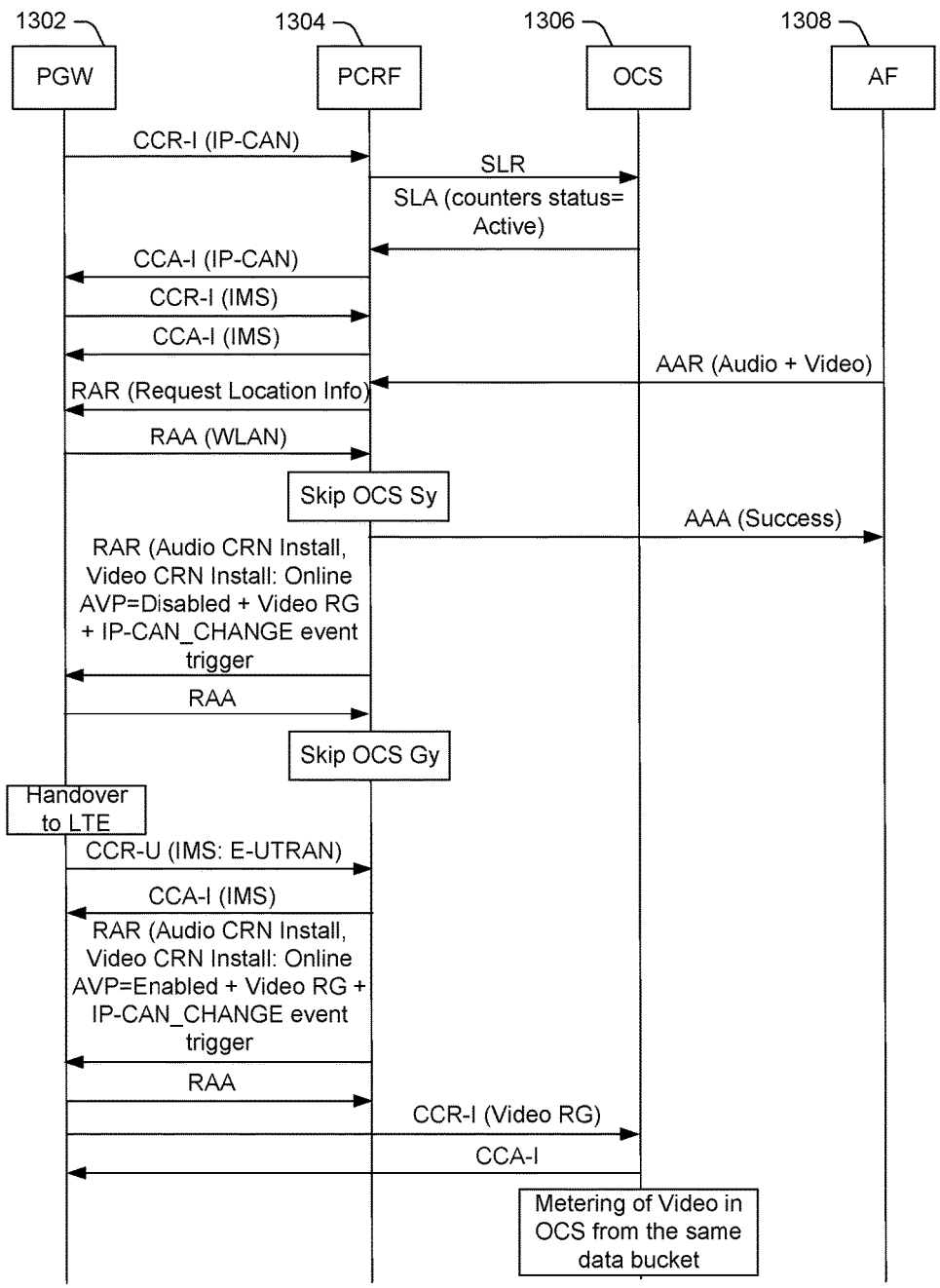
FIG. 13 is a block diagram showing an example call flow for initiating the metering of ViLTE data usage when a video call on a WLAN connection transitions to a ViLTE call using a LTE connection.

FIG. 13 is a block diagram showing an example call flow 1300 for initiating the metering of ViLTE data usage when a video call on a WLAN connection transitions to a ViLTE using a LTE connection. The example call flow 1300 illustrates the communications that are sent between the various components of the mobile telecommunication network 102, in which the components may include a PGW 1302, a PCRF 1304, an OCS 1306, and an AF 1308. The communications may result in the PCRF 1304 receiving messages that indicate the user device is not in throttled mode (e.g., counters status=active) while on a WLAN connection (e.g., WLAN in response to a location information request). Accordingly, the PCRF 1104 may command the PGW 1302 to establish an audio bearer (e.g., Audio CRN install) and a video bearer (e.g., Video CRN install). Since the user device is using a WLAN connection, no ViLTE data usage metering is performed (e.g., PCRF 1104 skips OCS Sy).

Subsequently, the PCRF 1304 may receive notification that the user device has switched to a LTE connection (e.g., IMS: E-UTRAN). Accordingly, the PGW 1302 and the OCS 1306 may exchange messages to further establish the metering of ViLTE data usage from a common data bucket that is shared by all data usages of the user device.

The techniques for metering ViLTE data usage and the performance of ViLTE call management based on such metering may ensure that the consumption of data by ViLTE calls are in line with their recurring service plans. Accordingly, the techniques may prevent the excessive consumption of data by the subscribers during ViLTE calls. Such excessive consumption has the potential to detrimentally affect the ability of other subscribers to access the data services provided by the wireless telecommunication provider.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a mobile telecommunication network storing computer-executable instructions that upon execution cause one or more processors to perform acts comprising:
    receiving a request to establish a video bearer between a mobile telecommunication network and a user device for a multimedia call at a policy engine of the mobile telecommunication network;
    retrieving information from a gateway of the mobile telecommunication network that indicates a connection type used by the user device to connect to the mobile telecommunication network;
    establishing the video bearer for a video over wireless local access network (WLAN) call of the user device without Video over Long Term Evolution (ViLTE) data usage metering in response to the user device having a WLAN connection type; and
    establishing the video bearer for a ViLTE call of the user device with ViLTE data usage metering in response to the user device having a LTE connection type.

2. The one or more non-transitory computer-readable media of claim 1, wherein the acts further comprise:
    retrieving a throttle mode status of the user device from a charging engine of the mobile telecommunication network, the mobile telecommunication network places the user device in a throttled mode following an amount of data used by the user device exhausting an allocated amount of data for the use device in a periodic billing cycle,
    wherein the establishing the video bearer with ViLTE data usage metering include providing ViLTE data usage metering for the ViLTE call in response to the user device having a LTE connection type and the user device is not in throttled mode.

3. The one or more non-transitory computer-readable media of claim 2, wherein the establishing the video bearer with ViLTE data usage metering includes sending a metering request from the policy engine to the gateway that causes the gateway to prompt the OCS to track the ViLTE data usage by the user device against an allocated amount of data for the user device in a periodic billing cycle.

4. The one or more non-transitory computer-readable media of claim 3, wherein the metering request is an Online attribute value pair (AVP) code that defines that a charging rule is to be enabled, and wherein gateway prompts the charging engine by establishing a communication session between the gateway and the charging engine to transmit a charging code and a device identifier of the user device that are used by the charging engine to charge the ViLTE data usage against the allocated amount of data for the user device.

5. The one or more non-transitory computer-readable media of claim 3, wherein the acts further comprise:
    receiving information from a connection monitor on the gateway indicating that the connection type of the user device switched from the LTE connection type to the WLAN connection type; and
    sending a metering termination request from the policy engine to the gateway that cause the gateway to command the charging engine to stop tracking the ViLTE data usage by the user device against the allocated amount of data for the user device in a periodic billing cycle.

6. The one or more non-transitory computer-readable media of claim 5, wherein the metering termination request causes the gateway to terminate a communication session between the gateway and the charging engine that signals the charging engine to track the ViLTE data usage by the user device against the allocated amount of data.

7. The one or more non-transitory computer-readable media of claim 1, wherein the acts further comprise:
    receiving information from a connection monitor on the gateway indicating that the connection type of the user device switched from the WLAN connection type to the LTE connection type; and
    sending a metering request from the policy engine to the gateway that causes the gateway to prompt a charging engine to track the ViLTE data usage by the user device against an allocated amount of data for the user device in a periodic billing cycle.

8. The one or more non-transitory computer-readable media of claim 1, wherein the acts further comprise:

receiving an indication from a charging engine of the mobile telecommunication network that the user device is in throttle mode when the connection type of the user device is the LTE connection type; and terminating the video bearer for the ViLTE call of the user device in response to the user device being in the throttle mode.

9. The one or more non-transitory computer-readable media of claim 8, wherein the terminating includes sending a video bearer termination request from the policy engine to the gateway that causes the gateway to terminate the video bearer between the user device and an IP Multimedia Subsystem (IMS) core of the mobile telecommunication network.

10. The one or more non-transitory computer-readable media of claim 1, wherein the establishing includes establishing the video bearer for the ViLTE call with ViLTE data usage metering following a determination based on a device identifier of the user device that the user device is permitted to make the multimedia call.

11. A computer-implemented method, comprising:
receiving a request to establish a video bearer between a mobile telecommunication network and a user device for a multimedia call at a policy engine of the mobile telecommunication network;
retrieving information from a gateway of the mobile telecommunication network that indicates a connection type used by the user device to connect to the mobile telecommunication network;
establishing the video bearer for a video over wireless local access network (WLAN) call of the user device without Video over Long Term Evolution (ViLTE) data usage metering in response to the user device having a WLAN connection type;
retrieving a throttle mode status of the user device from a charging engine of the mobile telecommunication network, the mobile telecommunication network places the user device in a throttled mode following an amount of data used by the user device exhausting an allocated amount of data for a periodic billing cycle;
terminating the establishment of the video bearer for the multimedia call in response to the user device having a LTE connection type and in the throttle mode; and
establishing the video bearer for a ViLTE call of the user device with ViLTE data usage metering in response to the user device having a LTE connection type and is not in throttled mode.

12. The computer-implemented method of claim 11, further comprising, prior to retrieving the information from the gateway of the mobile telecommunication network, determining that the user device is permitted to make the multimedia call based on a device identifier of the user device.

13. The computer-implemented method of claim 11, wherein the establishing the video bearer with ViLTE data usage metering includes sending a metering request from the policy engine to the gateway that causes the gateway to prompt the charging engine to track the ViLTE data usage by the user device against an allocated amount of data for the user device in a periodic billing cycle.

14. The computer-implemented method of claim 13, wherein the metering request is an Online attribute value pair (AVP) code that defines that a charging rule is to be enabled, and wherein gateway prompts the charging engine by establishing a communication session between the gateway and the charging engine to transmit a charging code and a device identifier of the user device that are used by the charging engine to charge the ViLTE data usage against the allocated amount of data for the user device.

15. The computer-implemented method of claim 14, further comprising:
receiving information from a connection monitor on the gateway indicating that the connection type of the user device switched from the LTE connection type to the WLAN connection type; and
sending a metering termination request from the policy engine to the gateway that cause the gateway to command the charging engine to stop tracking the ViLTE data usage by the user device against the allocated amount of data for the user device in a periodic billing cycle.

16. The computer-implemented method of claim 15, wherein the metering termination request causes the gateway to terminate the communication session between the gateway and the charging engine that signals the charging engine to track the ViLTE data usage by the user device against the allocated amount of data.

17. The computer-implemented method of claim 11, wherein the acts further comprise:
receiving information from a connection monitor on the gateway indicating that the connection type of the user device switched from the WLAN connection type to the LTE connection type; and
sending a metering request from the policy engine to the gateway that causes the gateway to prompt the charging engine to track the ViLTE data usage by the user device against an allocated amount of data for the user device in a periodic billing cycle.

18. The computer-implemented method of claim 11, further comprising:
receiving an update from the charging engine of the mobile telecommunication network indicating that the user device is in throttle mode when the connection type of the user device is the LTE connection type; and
terminating the video bearer for the ViLTE call of the user device in response to the user device being in the throttle mode.

19. One or more computing devices on a mobile telecommunication network, comprising:
one or more processors; and
memory having instructions stored therein, the instructions, when executed by the one or more processors, cause the one or more processors to perform acts comprising:
receiving a request to establish a video bearer between a mobile telecommunication network and a user device for a multimedia call at a policy engine of the mobile telecommunication network;
determining that the user device is permitted to make the multimedia call based on a device identifier of the user device;
retrieving information from a gateway of the mobile telecommunication network that indicates a connection type used by the user device to connect to the mobile telecommunication network;
establishing the video bearer for a video over local area network (WLAN) call of the user device without Video over Long Term Evolution (ViLTE) data usage metering in response to the user device having a WLAN connection type; and
establishing the video bearer for the ViLTE call of the user device with ViLTE data usage metering in response to the user device having a LTE connection type.

20. The one or more computing devices of claim 19, wherein the video bearer carries a video stream for the video over WLAN call or the ViLTE call, the video bearer being established in conjunction with an audio bearer that carries an audio stream for the video over WLAN call or the ViLTE call.

* * * * *